UNITED STATES PATENT OFFICE.

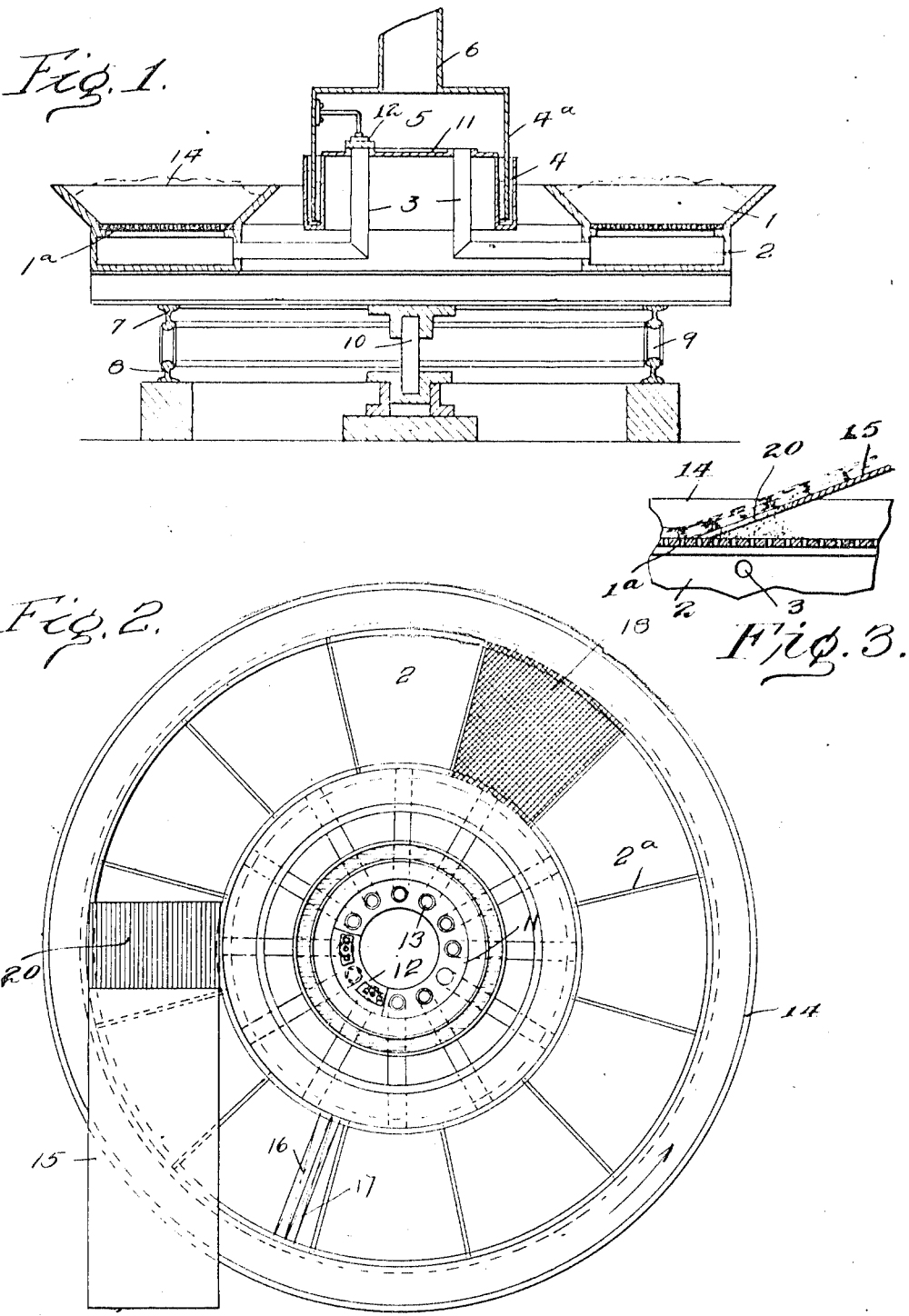

FELIX VON SCHLIPPENBACH, OF STOLBERG, BINSFELDHAMMER, GERMANY, ASSIGNOR, BY MESNE ASSIGNMENTS, TO DWIGHT & LLOYD SINTERING COMPANY, INCORPORATED, OF NEW YORK, N. Y., A CORPORATION OF DELAWARE.

MECHANISM FOR OXIDIZING, REDUCING, OR OTHERWISE TREATING ORES AND OTHER MATERIALS.

1,119,459.          Specification of Letters Patent.         Patented Dec. 1, 1914.

Application filed January 21, 1910. Serial No. 539,235.

*To all whom it may concern:*

Be it known that I, FELIX VON SCHLIPPENBACH, a subject of the Emperor of Germany, residing at Stolberg, Binsfeldhammer, Rheinland, Germany, have invented certain new and useful Improvements in Mechanism for Oxidizing, Reducing, or Otherwise Treating Ores and other Materials, of which the following is a specification, reference being had therein to the accompanying drawings.

The object of this invention is to provide an apparatus for uninterruptedly sintering, oxidizing, reducing, or otherwise treating ores, metallurgical products, or other materials, by means of gases or air, conducted through them, the novelty consisting in this, that the material to be handled is placed on a horizontal, ring-shaped, or circular hearth with a perforated bottom, under which there is arranged a divided air chamber connected with it, the divisions of the air chamber being adapted to be automatically switched in and out, in any desired number, the cut-off device being placed so far from the hearth that it is free from injurious action of dust and heat.

The advantages incident to this apparatus, in comparison with earlier ones, lie in this, that the operation is continuous, all the steps constituting the total method taking place simultaneously on one and the same hearth, and by which there are attained a considerable saving in time and an increase in output capacity. Moreover, the expense incident to human power is obviated by the cheaper mechanical power. A further advantage consists in this, that the earlier constructions utilized only a certain, and smaller, part of the hearth, while with the present method practically the entire hearth is in use, only a small part, approximately one-fourth being switched out.

In the drawings there are presented: Figure 1, which is a longitudinal section through the principal parts of the apparatus; and Fig. 2, a top plan, the flaring walls at the sides of the hearth and other parts being removed. Fig. 3 is a detail view partly in section showing the means for removing the finished product.

The hearth, as an entirety, is ring-shaped or circular in form. It is indicated, as a whole, by the numeral 1, and comprises the downwardly converging side walls 14, and the bottom 1ª, which is perforated to permit passage therethrough. The latter may be composed of sections, 18, or may be made in one piece, and is adapted to have the air and gases pass through it. The bottom plate or plates may be cast or otherwise formed integrally with the hearth structure or they may be separately formed and detachably fitted in place. Under the bottom is the air chamber 2 communicating with the perforations or passages in the bottom, this air-chamber comprising several sub-divisions. The partition walls forming these sub-divisions may be either integral with the hearth structure or separately formed and secured in place. From the sub-divisions or chambers, so provided, extend ducts 3 of any desired form, which are brought to a common chamber 5. This is preferably formed of a stationary cylindrical part 4ª, and a seal chamber at 4, the lower portion of the former fitting in the latter. The chamber 4 is adapted to rotate with the movable part of the structure and is filled with water, sand, mercury, or other suitable sealing material. To the bell part or cylinder 5 there is connected the duct 6 adapted to permit the passage of air or gas.

In the structure shown, there is below the hearth and the air chambers, a supporting and carrying frame, and to the latter there is fastened a ring 7 resting on guiding rollers 9, which in turn rest and roll upon a circular rail 8 secured to the foundation of the apparatus. At the vertical axis of the mechanism there is a king pin 10 mounted in a bearing supported on the foundation, this acting to center and steady the rotary structure.

The rotation of the hearth and the parts connected therewith can be accomplished in any suitable way, well known to engineers, as by a toothed ring and a power-driven pinion.

The bottom part of the receiver or bell cylinder 5 is closed by a plate or diaphragm 11 secured to the inner wall of the seal chamber 4, and having apertures 13 in which are fitted the ducts 3.

12 indicates a cut-off device which may consist of one or more plates, there being one shown. Instead of these, suitable cut-off balls, valves, or equivalents, may be employed. The single cut-off plate 12 illustrated is adapted to close three of the ducts 3 at a time, as the series of ducts rotate thereunder. It may be held and operated in any suitable way as for instance by being supported from the bell inclosing the chamber 5. As shown there is one duct 3 for each of the air compartments under the grate. While the cut-off plate is closing three of the ducts, the passage of air and gas to and from their air chambers 2 and the corresponding sections of the hearth is stopped; and at such time the finished product can be removed from the hearth without loss of air or gas and without variation in the pressure on the greater part (say, three-fourths) of the hearth which is still operated. At 16 there is a hopper for introducing cold material to be treated in a layer of suitable depth, and at 17 there is a hopper for introducing hot material in a stream or layer of suitable depth.

The finished product will be withdrawn from the grate by means of a proper inclined removing device 15 the lower edge of which rests upon or is held close to the surface of the grate or bottom 1ª. As shown, it consists of a grate-like element 20 over which pass the larger pieces or particles and through which everything falls which is in particles too small to be utilized advantageously in the later treatment.

In practising the process the lower edge of the removing device 15 operates to remove from the grate and break up the finished material. The finer particles lifted from the grate sift through the grate-like section 20 of the removing device and fall back upon the grate or hearth 1ª and thus constitute a protecting and inert layer for the hearth below the ore that is to be treated, while the larger pieces of the finished material pass on to the imperforate part of the device 15 whence they may be removed, either by hand or otherwise, as may be convenient.

It is to be noted that the hearth can be held stationary and the other parts of the apparatus can be rotated, such as the hoppers 16 and 17, the removing device 15 and the cut-off 12. However, I prefer to hold stationary the devices last specified and rotate the hearth and parts attached thereto, as above described.

What I claim is:

1. In an apparatus for sintering or roasting ore, the combination of an ore support, an air or gas chamber adjacent to the ore support, divided into sub-divisions, a series of ducts communicating respectively with the said sub-divisions of the air or gas chamber, a common conduit to which the said ducts lead, and a single device arranged to successively cut off the communication through the said ducts, between the said sub-divisions of the air or gas chamber and the said common conduit.

2. In an apparatus for sintering or roasting ore, the combination of an ore support, an air or gas chamber adjacent to the ore support, divided into sub-divisions, a series of ducts communicating respectively with the said sub-divisions of the air or gas chamber, a common chamber to which the said ducts lead and a cut off located within the said chamber arranged to successively close communication between the said sub-divisions of the air or gas chamber and the common chamber, through the said ducts.

3. In an apparatus for sintering or roasting ore, the combination of a horizontally rotatable ore support, a series of air or gas chambers located below the support, a series of ducts communicating respectively with the said air or gas chambers, a central chamber, a perforated diaphragm closing one end of the said chamber, the said ducts communicating with the chamber through the perforations in the said diaphragm, and a cut off device located within the said chamber, arranged to successively close the ends of the ducts which communicate with the central chamber.

4. In a mechanism for sintering or treating ore, the combination of a horizontally rotatable hearth adapted to have air or gas pass through the ore thereon, air ducts extending from the hearth toward the vertical axis thereof and communicating with a chamber for air or gas, sealing devices rotatable with the hearth for closing the said chamber to the outside atmosphere, and means in the said chamber for opening and closing the ducts, substantially as set forth.

5. In a mechanism for treating ore, the combination of a horizontally disposed annular hearth upon which the ore may be supported and treated, a seal chamber located within the central space inclosed by the hearth, a bell-like receiver which sets into the seal chamber, a duct leading off from the said receiver, a plate inside the said seal chamber closing the bell-like receiver at the bottom, and ducts leading from below the hearth and extending through the said plate into the chamber inclosed by the said receiver, substantially as set forth.

6. In an apparatus for sintering ore, the combination of a pervious support on which the ore is supported in a thin layer, and means for removing the sintered ore from the support, comprising a screening section arranged to allow the finer particles to sift through it and return to the support while the larger particles are retained thereby.

7. In an apparatus for sintering ore, the combination of a pervious support on which the ore is supported in a thin layer, and means for removing the sintered ore from the support comprising a grate-like screening element over which pass the larger particles of the material removed from the support while the finer particles sift through it and return to the support below, the ore support and the said removing device being movable one with reference to the other.

In testimony whereof I affix my signature, in presence of two witnesses.

FELIX von SCHLIPPENBACH.

Witnesses:
FREDERICK ACHENBACH,
HENRY QUADFLIEG.